United States Patent
Frey

(10) Patent No.: US 11,193,392 B2
(45) Date of Patent: Dec. 7, 2021

(54) CMC PLY OVERLAP INGESTION RESTRICTOR

(71) Applicant: General Electric Company, Schenectady, NY (US)

(72) Inventor: David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1210 days.

(21) Appl. No.: 15/075,363

(22) Filed: Mar. 21, 2016

(65) Prior Publication Data

US 2017/0268359 A1 Sep. 21, 2017

(51) Int. Cl.
  *F01D 25/00* (2006.01)
  *F01D 25/24* (2006.01)
  *F01D 11/02* (2006.01)

(52) U.S. Cl.
  CPC ............ *F01D 25/246* (2013.01); *F01D 11/02* (2013.01); *F05D 2240/11* (2013.01); *F05D 2300/6033* (2013.01); *Y02T 50/60* (2013.01)

(58) Field of Classification Search
  CPC .... F01D 25/246; F01D 11/02; F05D 2240/11; F05D 2300/6033
  See application file for complete search history.

(56) References Cited

U.S. PATENT DOCUMENTS

| | | | |
|---|---|---|---|
| 4,648,792 A * | 3/1987 | Baran, Jr. | F01D 11/08 415/139 |
| 9,080,457 B2 | 7/2015 | Shi | |
| 2012/0156029 A1* | 6/2012 | Karafillis | F01D 9/02 415/213.1 |
| 2014/0242348 A1* | 8/2014 | Shi | F01D 9/042 428/189 |

FOREIGN PATENT DOCUMENTS

WO WO2014/186099 A1 11/2014

* cited by examiner

*Primary Examiner* — Katheryn A Malatek
(74) *Attorney, Agent, or Firm* — Dority & Manning, P.A.

(57) ABSTRACT

An ingestion restricting device is provided, which is particularly useful in a turbine engine. The ingestion restricting device can include a first component defining a first edge and including a plurality of ceramic matrix composite (CMC) plies forming outer, inner, and intermediate layers. The ingestion restricting device can also include a second component adjacent to the first component and defining a second edge. The first edge of the first component is opposite the second edge of the second component and defines a gap therebetween. Also, at least one ply of the plurality of CMC plies in the outer layer of the first component comprises an integral protrusion extending from the first edge a distance sufficient to traverse the gap and to overlap the second edge of the second component.

17 Claims, 6 Drawing Sheets

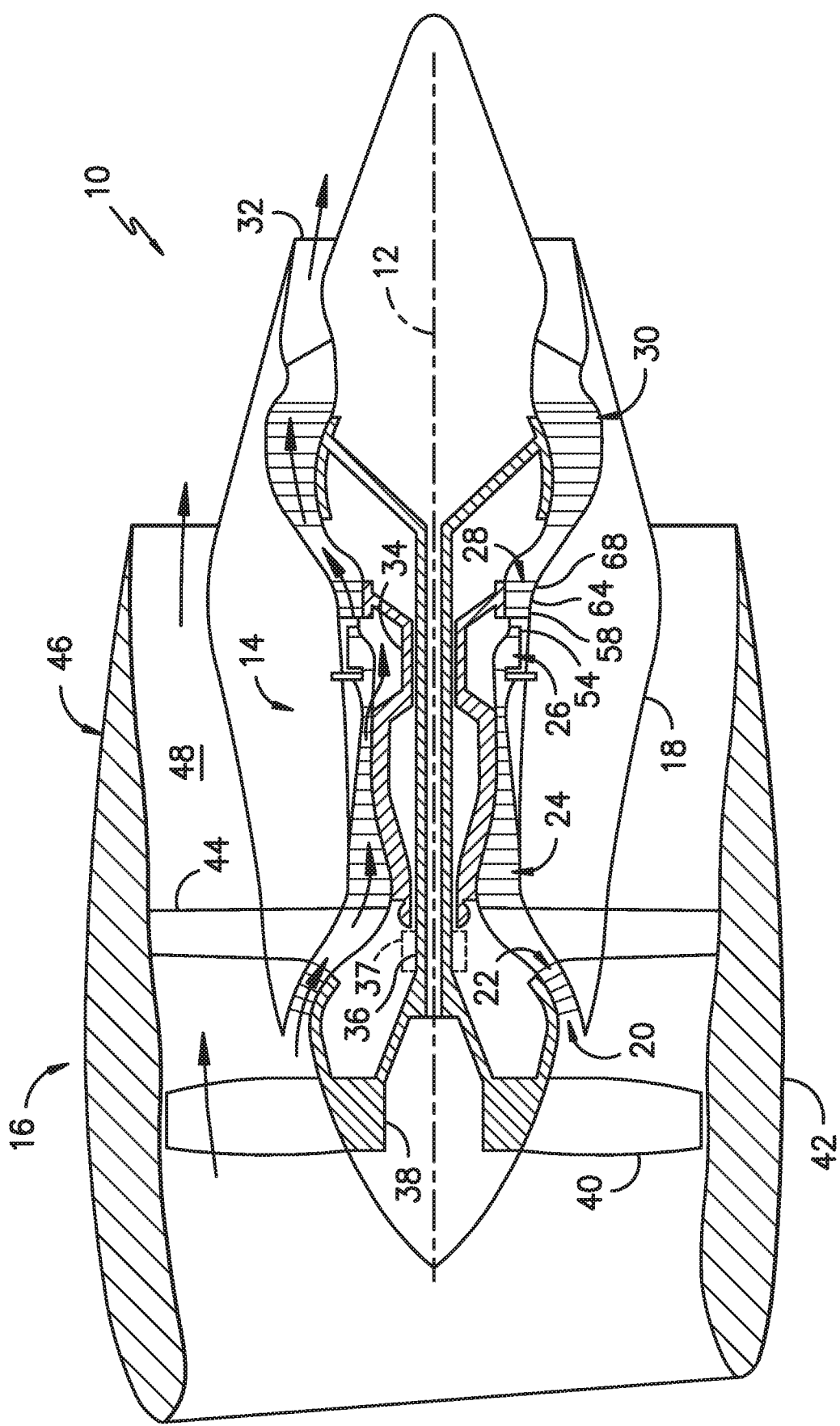
FIG. -1-

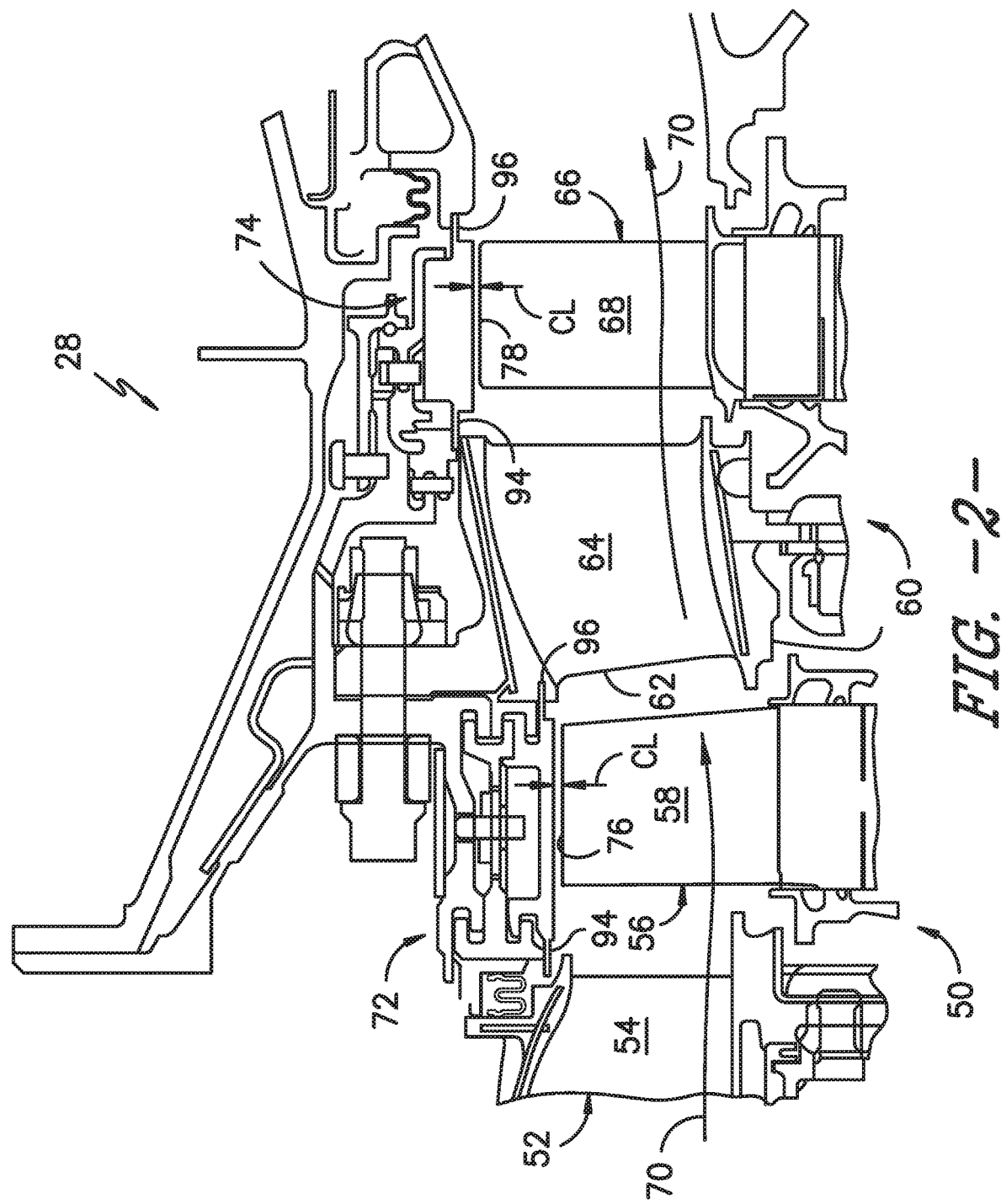

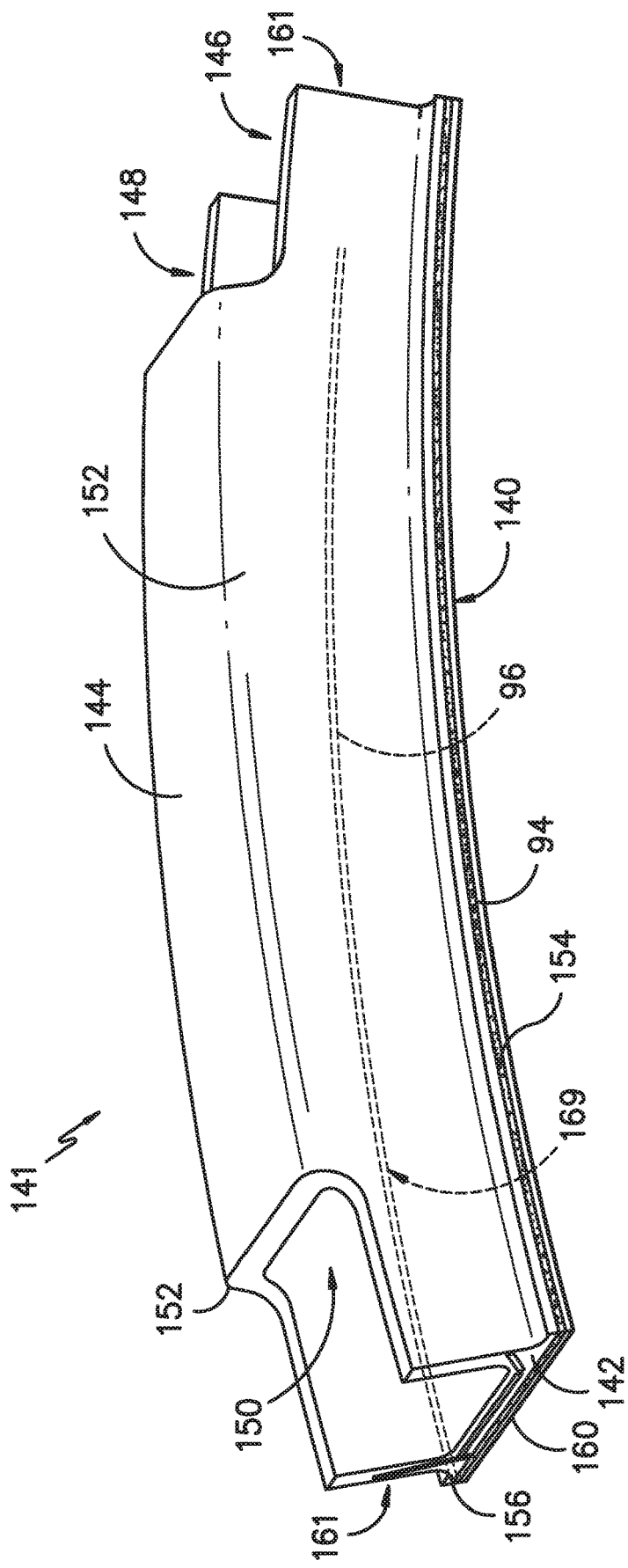
FIG. -3-

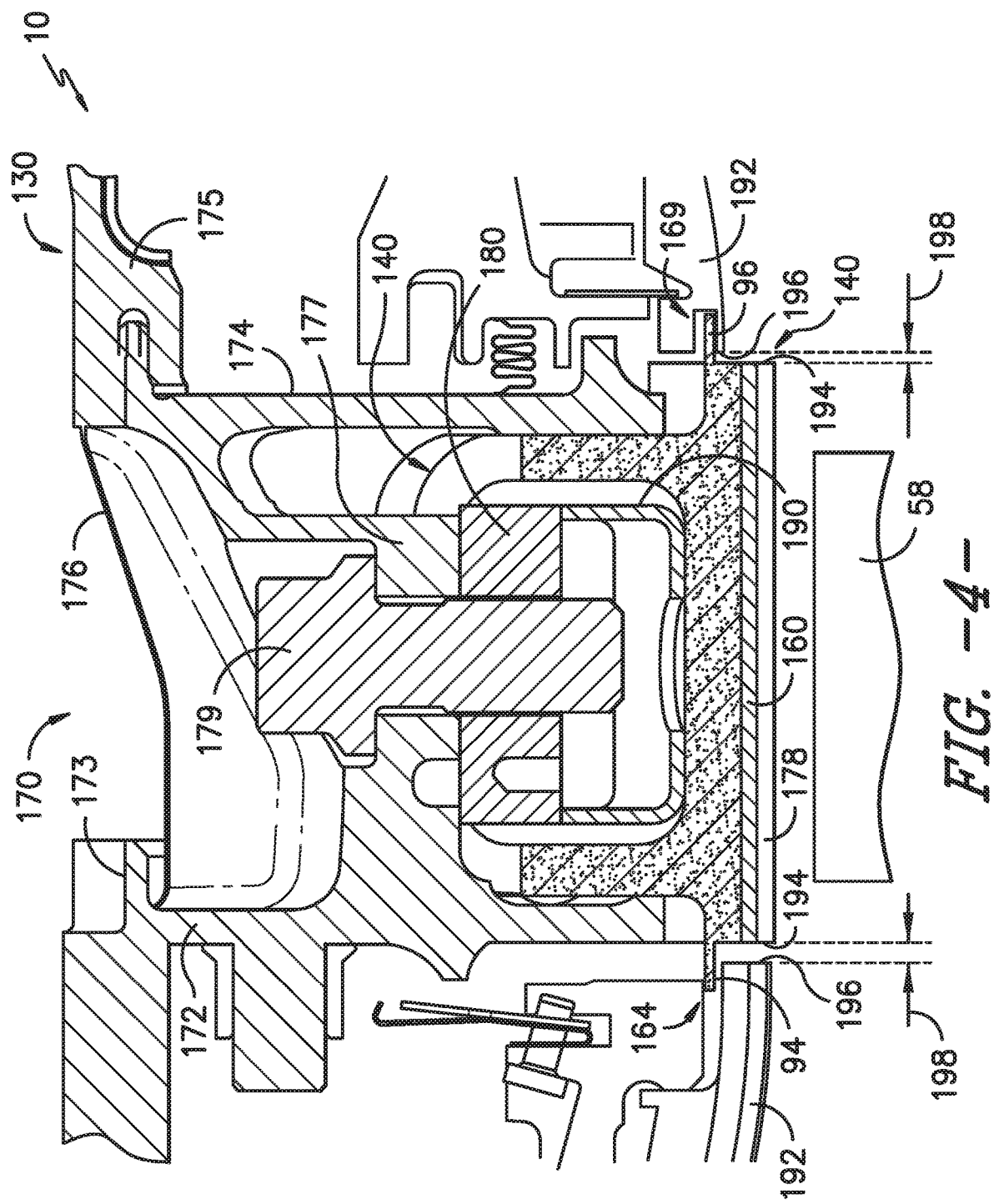
FIG. -4-

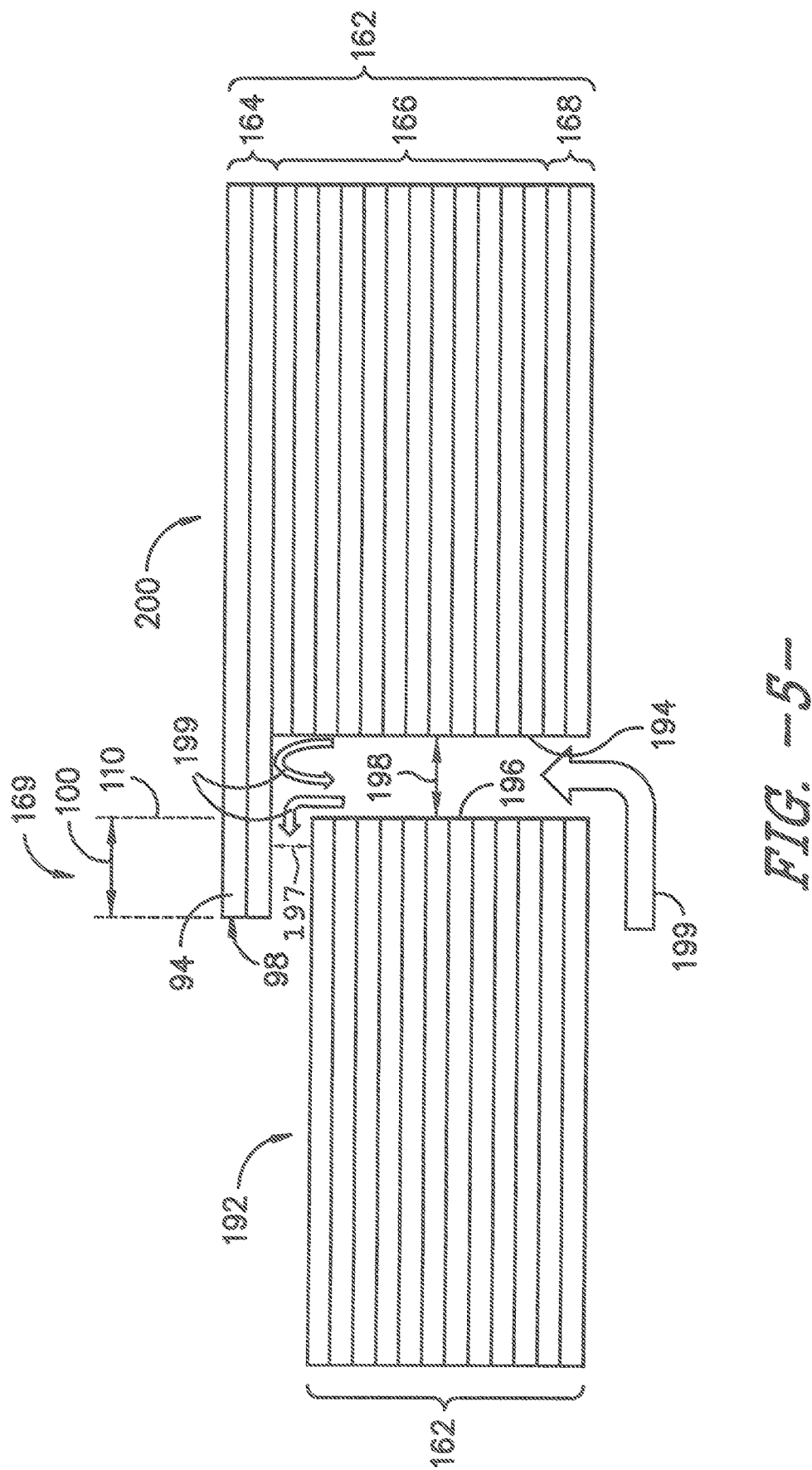

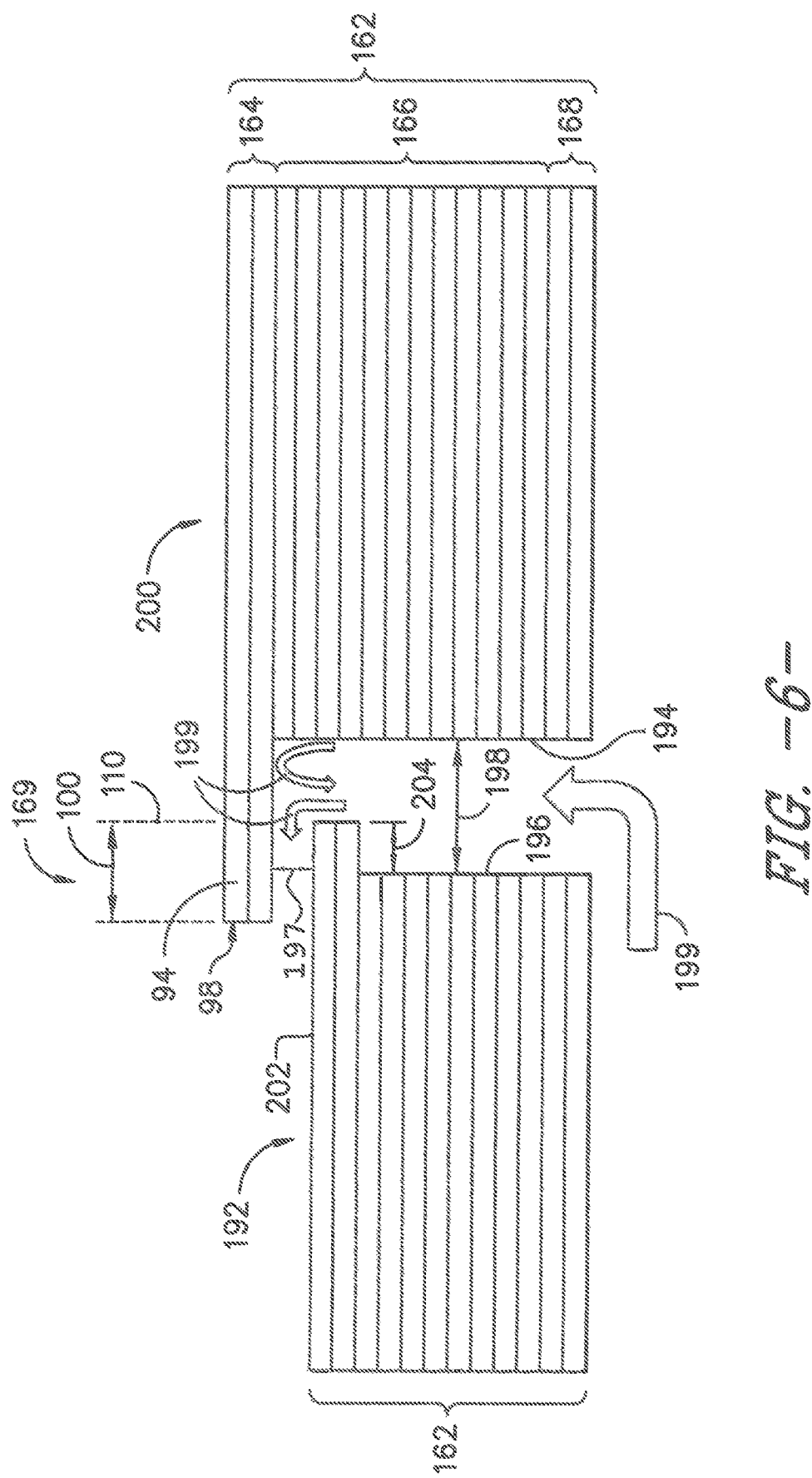
FIG. -6-

CMC PLY OVERLAP INGESTION RESTRICTOR

FIELD OF THE INVENTION

The present disclosure generally pertains to adjacent components of gas turbine engines that have a gap therebetween. More particularly, but not by way of limitation, present embodiments relate to ceramic matrix composite (CMC) shrouds and adjacent components utilized in gas turbine engines that can experience hot gas ingestion in the gap.

BACKGROUND OF THE INVENTION

A typical gas turbine engine generally possesses a forward end and an aft end with its several core or propulsion components positioned axially therebetween. In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Each of the turbines may include one or more stages of rotor blades which extend radially outward from rotor discs. A shroud assembly circumscribes the turbine rotor and defines an outer boundary for combustion gases flowing through the turbine. The turbine shroud may be a single unitary structure or may be formed of a plurality of segments. Some known shroud assemblies include a shroud hanger that is coupled to an outer casing of the engine to provide support to a plurality of shrouds positioned adjacent to, and radially outward of, the tips of the turbine blades. The shrouds may be coupled by way of a single bolted connection to the shroud hanger. However, should a crack or bolt failure occur, the shroud may become disconnected from the shroud hanger.

The shroud must be capable of meeting the design life requirements for use in the turbine engine operating temperature and pressure environment. To enable current materials to operate effectively in such strenuous temperature and pressure conditions, it has been practiced to utilize composite and, in particular, ceramic matrix composite (CMC) materials for use in the shroud segments because they have higher temperature capability than metallic type parts. CMC components may be designed not to touch adjacent hardware thereby forming gaps in the flowpath which can allow hot gases to penetrate and cause distress of non-CMC components. Hot combustion gases are ingested in these gaps between a CMC component and adjacent components. As a result, internal engine parts are exposed to excessive temperatures.

The demand for turbine component cooling flow is impacted by irregular ingestion of mainstream hot gases from the hot gas flow path into the internal engine cavity. Various attempts to prevent flow between adjacent stator vanes and rotor blades have primarily involved the use of overlapping metal lip-type structures in close running clearance, often referred to as flow discouragers. A variety of baffle-type structures and techniques have also been proposed in an effort to minimize hot gas ingestion into the internally cooled cavity of gas turbine engines. Such approaches have included pockets with complex shapes, some of which receive separate cooling flow, to prevent hot gas ingestion. These structures have not been as effective as desired in preventing hot gas ingestion.

Accordingly, it is desirable to provide an improved gas turbine engine assembly that reduces or eliminates hot gas ingestion. Moreover, it would be desirable to improve CMC shroud leak restriction and limit ingestion of hot gases into the gas turbine engine. Other desirable features and characteristics of the present invention will become apparent from the subsequent detailed description of the invention and the appended claims, taken in conjunction with the accompanying drawings and this background of the invention.

BRIEF DESCRIPTION OF THE INVENTION

Aspects and advantages of the invention will be set forth in part in the following description, or may be obvious from the description, or may be learned through practice of the invention.

An ingestion restricting device is generally provided, which is particularly useful in a turbine engine. In one embodiment, the ingestion restricting device includes a first component defining a first edge and including a plurality of ceramic matrix composite (CMC) plies forming outer, inner, and intermediate layers. The ingestion restricting device also includes a second component adjacent to the first component and defining a second edge. The first edge of the first component is opposite the second edge of the second component so as to define a gap therebetween. Also, at least one ply of the plurality of CMC plies in the outer layer of the first component comprises an integral protrusion extending from the first edge a distance sufficient to traverse the gap and to overlap the second edge of the second component.

A gas turbine engine is also generally provided. In one embodiment, the gas turbine engine includes a compressor, a combustor disposed downstream from the compressor, a turbine disposed downstream from the combustor, and an ingestion restricting device. The ingestion restricting device may include a first component defining a first edge and having a plurality of ceramic matrix composite (CMC) plies forming outer, inner, and intermediate layers and a second component adjacent to the first component. The second component defines a second edge that is opposite of the first edge of the first component so as to define a gap therebetween. At least one ply of the plurality of CMC plies in the outer layer of the first component has an integral protrusion that extends from the first edge a distance sufficient to traverse the gap and to overlap the second edge of the second component.

Methods are also generally provided for restricting ingestion of hot gas in a gas turbine engine. In one embodiment, the method includes laying up plies to form a ceramic matrix composite (CMC) first component having an integral protrusion from a first edge thereof, and positioning the CMC first component adjacent a second component having a second edge thereby defining a gap between the first edge and the second edge. The integral protrusion in the CMC first component extends from the first edge a distance sufficient to traverse the gap and to overlap the second edge of the second component thereby restricting ingestion through the gap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which:

FIG. 1 is a schematic cross-sectional view of an exemplary gas turbine engine in accordance with an embodiment of the present disclosure;

FIG. 2 is an enlarged circumferential cross sectional side view of an exemplary high pressure turbine portion of a gas turbine engine in accordance with an embodiment of the present disclosure;

FIG. 3 is an isometric view of an exemplary CMC shroud with integrated protrusions;

FIG. 4 is a side section view of an exemplary CMC turbine shroud with integrated protrusions assembled between forward and aft engine components;

FIG. 5 is a schematic of exemplary pair of adjacent CMC plied components with the ingestion restriction device protrusion extending to overlap the adjacent component; and FIG. 6 is a schematic of another pair of exemplary adjacent CMC plied components with the ingestion restriction device protrusion extending to overlap the adjacent component.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine exhaust nozzle, or a component being relatively closer to the engine exhaust nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Some CMC components, such as shroud assemblies, are designed not to touch adjacent hardware thereby forming gaps in the flow path that can allow hot gases to penetrate and cause distress of non-CMC components and other components. When hot combustion gases are ingested in these gaps between a CMC component and adjacent components, internal engine parts are exposed to excessive temperatures imposing additional cooling load on the engine. The ingestion restriction device disclosed herein provides an improved gas turbine engine assembly that reduces or eliminates hot gas ingestion thereby providing thermal and corrosive protection for internal engine parts. In some engine locations, the ingestion restricting device, by itself, may be sufficient protection for internal engine parts. In other engine locations, an additional sealing device may be required to provide sufficient thermal and corrosive protection. When a sealing device is required, the ingestion restricting device still provides thermal protection for the sealing device and extends the life of the sealing device.

Referring now to the drawings, FIG. 1 is a schematic cross-sectional view of an exemplary high-bypass turbofan type engine 10, herein referred to as "turbofan," as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vane nozzles 54 (only one shown) axially spaced from an annular array 56 of turbine rotor blades 58 (only one shown). The HP turbine 28 further includes a second stage 60 which includes an annular array 62 of stator vane nozzles 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vane nozzles 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor nozzles. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70. To further assist in reducing leakage from the hot gas path 70, each shroud assembly 72, 74 can include first and second integral protrusions 94, 96 extending from the edges of the shroud assemblies 72, 74 to traverse the gap and overlap adjacent components of the turbine thereby restricting ingestion of hot gas 199 (FIG. 5) from the hot gas flow path 70 into the internal engine cavity.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Referring now to FIG. 3, an isometric view of an exemplary shroud segment 141 is depicted with the ingestion restricting device 169 having integral protrusions 94, 96 shown on the forward and aft overhangs 154, 156. The shroud segment 141 is part of the shroud assemblies 72, 74 in FIG. 2. Each shroud segment 141 has a generally hollow cross-sectional shape defined by a radially inner wall 142 and a radially outer wall 144 and forward and aft support walls 146, 148. Various cross-sectional shapes may be defined and the depicted shape should not be considered limiting. The radial inner wall 142 and the forward and aft support walls 146, 148 define a hollow interior or cavity 150 through which air may pass for cooling of the shroud segments 141. A transition wall 152 may also be located between the forward support wall 146 and the radially outer wall 144. The transition wall 152 may be curved as shown or at an acute angle to the longitudinal axis 12 of the engine 10. The walls 142, 144, 146, 148, 152 may be joined by radiused, sharp or squared-edged transitions between the intersections of the walls. As shown herein, the walls are generally radiused which may improve manufacture of the part.

The radially inner wall 142 extends beyond the forward support wall 146 and aft support wall 148 to define forward and aft overhangs 154, 156. When a plurality of shroud segments 141 are positioned together, a substantially continuous flow surface 160 is defined along the radially inner side of wall 142. Extending from the forward and aft overhangs 154, 156 are the first and second integral protrusions 94, 96. A first adjacent component, for example a shroud segment 141, can include first and second integral protrusions 94, 96. At least one ply of the plurality of CMC plies in the outer layer of the forward overhang 154 or aft overhang 156 can extend from the edge a distance sufficient to cover the gap between the first and second adjacent components and overlap the opposing edge of the second component thereby restricting ingestion through the gap.

The shroud segments 141 include end faces 163 which are commonly referred to as "slash faces." The slash faces 163 may lie in plane parallel to the center line axis 12 of the engine 10, referred to as a "radial plane", or they may be slightly offset from the radial plane, or otherwise oriented so that they are at an acute angle to such radial plane. Along the slash faces 163 are relief sections, which in combination with adjacent relief sections of adjacent segments 141 form apertures. When a plurality of segments 141 are positioned to form a shroud 140, the shroud 140 has a plurality of circumferentially spaced apertures formed by adjacent relief sections located at the slash faces 163. The shroud 140 is supported from the hanger 170 and retainer 180 at these locations (see FIG. 4).

The shroud segments 141 may be constructed of various low ductility and low coefficient of thermal expansion materials including but not limited to a ceramic matrix composite (CMC). Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). The shroud segment 141 can also be constructed of other low-ductility, high-temperature-capable materials. CMC materials generally have room temperature tensile ductility of less than or equal to about 1% which is used herein to define a low tensile ductility material. More generally, CMC materials have a room temperature tensile ductility in the range of about 0.4% to about 0.7%.

CMC materials also have a characteristic where the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions. Additionally, the shroud segment 141 may incorporate a layer of environmental barrier coating and/or an abradable material 178, as can be seen in FIG. 4.

Referring now to FIG. 4, a side section view of exemplary shroud support system 130 for the ingestion restricting device 169 is depicted. An exemplary turbine is shown, however the instant embodiments are not limited to turbine use. The turbine 10 includes a row of circumferentially spaced stationary vanes (not shown) and a plurality of circumferentially spaced turbine blades 58 downstream of the vanes. The blades 58 are foil-shaped and mounted to a turbine rotor disk (not shown). Each of the blades 58 extends radially toward a shroud 140. The shroud 140 extends circumferentially about the longitudinal engine axis 12 and is comprised of a plurality of shroud segments 141. Optionally, the shroud 140 may be formed of one unitary structure. The shroud 140 is tightly configured relative to the blades 58 so that the shroud 140 defines an outer radial flow path boundary for the hot combustion gas flowing through the turbine 10.

The shroud hanger system 130 includes a hanger 170, an ingestion restricting device 169 on a shroud 140 having a plurality of shroud segments 141 and a retainer 180. A baffle 190 may optionally be used within the shroud segment 141 and beneath the retainer 180. A shroud hanger 170 is connected to the engine casing and extends circumferentially about a portion of the engine, for example the turbine. An engine casing 18 extends circumferentially about the engine axis 12. Hangers 170 are extending from the radially inward side of the engine casing 18. The hangers 170 retain the shroud segments 141 in circular configuration about the engine axis 12 and the shroud segments 141 define the flow boundary within portions of the engine 10, for non-limiting example, the compressor 24 or turbine 28.

The shroud hanger 170 is defined by a plurality of segments which in combination, extend about the central axis 12 of the engine. The shroud hanger 170 includes a first wall 172 a second wall 174, each of which extend in a radial direction and in a circumferential direction. A hanger gusset 176 extends between the first wall 172 and the second wall 174 and may extend axially or may extend at an angle to the central axis 12 as depicted. According to instant embodiment, the gusset 176 is tapered from a lower radial height at the first wall 172 to a higher radial height at the second wall 174. The shroud hanger 170 includes tabs or hooks 173, 175 which may be utilized to engage the engine casing. The gusset 176 may alternatively be flat or tapered in the opposite direction. These hooks 173, 175 may take various forms in order to provide a mounting assembly or structure.

As depicted, the shroud hanger 170 has a space between the first wall 172 and the second wall 174 where the shroud segment 141 may be positioned. The lower most surface of the shroud segment 141 defines an outer surface of an airflow path within the gas turbine engine, for example a compressor or turbine. The segments 141 may further comprise an abradable material 178 on the innermost flow surface 160. Radially inward from the shroud segment is an airfoil blade 58 which rotates during operation of the gas turbine engine 10 with a rotor disk.

A bolt 179 is positioned within the shroud hanger 170 and extends downwardly through a hanger boss 177. The bolt 179 is connected to the retainer 180 which extends in a circumferential direction through the ingestion restricting shroud segment 141. The retainer 180 captures the shroud segment 141 within the shroud hanger 170 inhibiting the segment 141 from being removed from the shroud hanger 170. Each shroud hanger 170 includes two bosses 177 which are spaced apart circumferentially and are disposed near circumferential ends of the ingestion restricting shroud segment 141. With the retainer 180 extending through the ingestion restricting shroud segment 141, the shroud segment 141 is captured between the first and second walls 172, 174 and within the open space of the shroud hanger 170. Beneath the retainer 180 is a baffle 190 which aids with cooling of the shroud segments 141. First and second integral protrusions 94, 96, extending from the edges of the shroud segment overhangs 154, 156, traverse the gap 198 between adjacent components and overlap the adjacent components 192 of the turbine thereby restricting ingestion of hot gas 199 (FIG. 5) from the hot gas flow path 70 into the internal engine cavity.

Referring now to FIG. 5, the ingestion restricting device 169 has a first component 200, for example a shroud 140, that defines a first edge 194. The first component 200 has a plurality of ceramic matrix composite (CMC) plies 162 forming outer 164, inner 168, and intermediate layers 166. A second component 192, adjacent to the first component 140, defines a second edge 196. The first edge 194 of the first component 200 is opposite the second edge 196 of the second component 192 and defines a gap 198 therebetween. At least one ply of the plurality of CMC plies 162 in the outer layer 164 of the first component 140 has an integral protrusion 94 extending from the first edge 194 to the protrusion edge 98 a distance sufficient to traverse the gap 198 and to overlap 100 the second edge 196 of the second component 192. Overlap 100, as seen in FIG. 5, is the distance from a second edge line 110 to the protrusion edge 98. In one embodiment, the overlap 100 extends for a distance of about 10% to about 200% of the gap 198. In other embodiments, the overlap 100 extends for a distance of about 50% to about 150% of the gap 198. The protrusion 94 of the first component 200 is spaced apart a distance from the second component 192 to define a second gap 197 therebetween.

In some embodiments, the second component 192 also has a plurality of ceramic matrix composite (CMC) plies 162 similar to the first component 140. Referring to FIG. 6, the second component 192 is formed from a plurality of CMC plies 162, and defines a second protrusion 202 that extends from the second edge 196 into the gap 198 for a distance 204. Thus, the second protrusion 192 and the first protrusion 169 work together to form a tortuous path for the ingested gas 199. However, in other embodiments, the second component 192 may be formed from any suitable material (e.g., metal alloy, etc.). The gap 198 of the ingestion restricting device 169 can define a radial gap variation of about 0.1 inches to about 0.2 inches and an axial gap variation of about 0.01 to about 0.05 inches.

Although shown as including two CMC plies, the integral protrusions 94, 96 may have any thickness desired. For example, in some embodiments of the ingestion restricting device, the integral protrusions 94, 96 comprise at least four CMC plies. In most embodiments, the integral protrusions 94, 96 are disposed on the cold side, i.e., as an extension of the outer layer 164, of the first component 200 while the inner layer 168 is disposed on the hot side of the first component 200. Further embodiments of the ingestion restricting device have the first component 200 constructed from CMC plies and the second component 192 constructed from a metallic material. In most embodiments of the ingestion restricting device, the integral protrusions 94, 96 are positioned to avoid contact with the second component 192 during relative motion between the first component 200 and second component 192.

The ingestion restricting device embodied in a gas turbine engine 10 can be included in any portion of the engine 10, including within a fan section 16, a compressor 24, a combustor 26 disposed downstream from the compressor 24, a turbine 28 disposed downstream from the combustor 26, and an embodiment of the ingestion restricting device taught above.

A method is also generally provided for restricting ingestion of hot gas 199 in a gas turbine engine 10. In one embodiment, the method may include laying up plies 162 to form a ceramic matrix composite (CMC) first component 200 having an integral protrusion 94 extending from a first edge 194 thereof. The CMC first component 200 may be positioned adjacent to a second component 192 having a second edge 196 thereby defining a gap 198 between the first edge 194 of the first component 200 and the second edge 196 of the second component 192. The integral protrusion 94 of the CMC first component 200 extends from the first edge 194 a distance sufficient to traverse the gap 198 and to overlap 100 the second edge 196 of the second component 192 thereby restricting ingestion through the gap 198. The method can be used when the first component is made from CMC plies and the second component is made from a CMC component, a metal component, or another suitable material.

For example, the CMC material may be a silicon based, non-oxide ceramic matrix composite. As used herein, "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An ingestion restricting device for a gas turbine engine for restricting ingestion of hot gas from a hot gas flow path to an internal cavity of the gas turbine engine, the gas turbine engine defining a forward end, an aft end, an axial direction, and a radial direction, and the hot gas flow path defining a hot gas flow path direction, the ingestion restricting device comprising:

a first component defining a first edge, wherein the first component comprises a plurality of ceramic matrix composite (CMC) plies forming an outer layer, a plurality of CMC plies forming an inner layer, and a plurality of CMC plies forming an intermediate layer; and a second component adjacent to the first component and defining a second edge, wherein the first edge of the first component is opposite the second edge of the second component so as to define a first gap disposed axially between the first edge and the second edge;

wherein at least one ply of the plurality of CMC plies in the outer layer of the first component comprises an integral protrusion extending from the first edge a distance sufficient to traverse the first gap and to overlap the second edge of the second component, the first gap extending continuously from the inner layer of the first component to the integral protrusion of the first component, wherein the integral protrusion and the second component define a second gap therebetween, the second gap being in fluid communication with the first gap, and wherein the second gap is disposed radially between the integral protrusion and the second component, wherein the second gap is in fluid communication with the first gap from a location radially inward from an innermost ply of the first component to a location forward of a forwardmost edge of the integral protrusion of the first component, wherein the integral protrusion extends in a direction opposite of the hot gas flow path direction.

2. The ingestion restricting device of claim 1, wherein the second component comprises a plurality of CMC plies forming an outer layer, a plurality of CMC plies forming an inner layer, and a plurality of CMC plies forming an intermediate layer, and at least one ply of the plurality of CMC plies in the outer layer of the second component extends from the second edge and partially into the gap.

3. The ingestion restricting device of claim 1, wherein the overlap extends for a distance of about 10% to about 200% of the gap.

4. The ingestion restricting device of claim 1, wherein the overlap extends for a distance of about 50% to about 150% of the gap.

5. The ingestion restricting device of claim 1, wherein the first component is a CMC component and the second component is a metal component.

6. The ingestion restricting device of claim 5, wherein the first gap defines an axial gap variation of 0.01 to 0.05 inches, the axial gap variation being a range of distances between the first edge of the first component and the second edge of the second component along the axial direction.

7. The ingestion restricting device of claim 1, wherein the first component is a shroud segment for a shroud that circumscribes a turbine rotor of the gas turbine engine.

8. The ingestion restricting device of claim 1, wherein the first edge extends from an innermost ply of the plurality of CMC plies forming the inner layer to an outermost ply of the plurality of CMC plies forming the intermediate layer, wherein the first edge is continuously parallel to the second edge.

9. The ingestion restricting device of claim 1, wherein the first edge, the gap, and the second edge are all aligned at least partially along the axial direction.

10. The ingestion restricting device of claim 1, wherein the first gap and the second gap are empty spaces such that another component is not within the first gap or the second gap.

11. A gas turbine engine defining an axial direction and a radial direction, comprising:
   a compressor;
   a combustor disposed downstream from the compressor;
   a turbine disposed downstream from the combustor; and
   an ingestion restricting device for restricting ingestion of hot gas from a hot gas flow path to an internal cavity of the gas turbine engine, the hot gas flow path defining a hot gas flow path direction, the ingestion restricting device comprising:
      a first component defining a first edge, wherein the first component comprises a plurality of ceramic matrix composite (CMC) plies forming an outer layer, a plurality of CMC plies forming an inner layer, and a plurality of CMC plies forming an intermediate layer; and
      a second component adjacent to the first component and defining a second edge, wherein the first edge of the first component is opposite the second edge of the second component so as to define a gap disposed axially between the first edge and the second edge;
   wherein at least one ply of the plurality of CMC plies in the outer layer of the first component comprises an integral protrusion extending from the first edge a distance sufficient to traverse the gap and to overlap the second edge of the second component, the gap extending continuously from the inner layer of the first component to the integral protrusion of the first component;
   wherein the integral protrusion and the second component define a second gap therebetween, the second gap being in fluid communication with the first gap, and wherein the second gap is disposed radially between the integral protrusion and the second component,
   wherein the second gap is in fluid communication with the first gap from a location radially inward from an innermost ply of the first component to a location forward of a forwardmost edge of the integral protrusion of the first component,
   wherein the integral protrusion extends in a direction opposite of the hot gas flow path direction.

12. The engine of claim 11, wherein the second component comprises a plurality of CMC plies forming an outer layer, a plurality of CMC plies forming an inner layer, and a plurality of CMC plies forming an intermediate layer, and at least one ply of the plurality of CMC plies in the outer layer of the second component extends partially from the second edge and partially into the gap.

13. The engine of claim 11, wherein the overlap extends for a distance of about 10% to about 20% of the gap.

14. The engine of claim 11, wherein the first component is a CMC component and the second component is a metal component.

15. The engine of claim 11, wherein the first component is a shroud segment for a shroud that circumscribes a turbine rotor of the gas turbine engine.

16. The engine of claim 11, wherein the first edge extends from an innermost ply of the plurality of CMC plies forming the inner layer to an outermost ply of the plurality of CMC plies forming the intermediate layer, wherein the first edge is continuously parallel to the second edge.

17. An ingestion restricting device for a gas turbine engine for restricting ingestion of hot gas from a hot gas flow path to an internal cavity of the gas turbine engine, the gas turbine engine defining an axial direction and a radial direction, and the hot gas flow path defining a hot gas flow path direction, the ingestion restricting device comprising:
   a first component defining a first edge, wherein the first component comprises a plurality of ceramic matrix composite (CMC) plies forming an outer layer, a plurality of CMC plies forming an inner layer, and a plurality of CMC plies forming an intermediate layer; and
   a second component adjacent to the first component and defining a second edge, wherein the first edge of the first component is opposite the second edge of the second component so as to define a gap disposed axially between the first edge and the second edge;
   wherein at least one ply of the plurality of CMC plies in the outer layer of the first component comprises an integral protrusion extending from the first edge a distance sufficient to traverse the gap and to overlap the second edge of the second component, the gap extending continuously from the inner layer of the first component to the integral protrusion of the first component,
   wherein the first edge extends from an innermost ply of the plurality of CMC plies forming the inner layer to the integral protrusion, wherein the first edge is continuously parallel to the second edge.

* * * * *